United States Patent [19]

Ferdows et al.

[11] Patent Number: 4,679,616
[45] Date of Patent: Jul. 14, 1987

[54] ROOF-MOUNTED AIR CONDITIONER SYSTEM HAVING MODULAR EVAPORATOR AND CONDENSOR UNITS

[75] Inventors: Houshang Ferdows, Boulder, Colo.; Martin Krug, Möglingen; Paul R. Bihl, Ditzingen, both of Fed. Rep. of Germany

[73] Assignee: Suetrak U.S.A., Inc., Lamar, Colo.

[21] Appl. No.: 832,971

[22] Filed: Apr. 28, 1986

Related U.S. Application Data

[63] Continuation of Ser. No. 565,026, Dec. 20, 1983, Pat. No. 4,607,497.

[51] Int. Cl.4 .............................................. B60H 3/00
[52] U.S. Cl. ......................................... 165/43; 165/53
[58] Field of Search ...................... 165/43, 53; 62/259, 62/1, 263, 244, 448

[56] References Cited

U.S. PATENT DOCUMENTS

| | | | |
|---|---|---|---|
| 2,032,572 | 3/1936 | Hammers et al. | 62/117 |
| 2,320,596 | 6/1943 | Henney | 98/10 |
| 2,404,961 | 7/1946 | Hoch | 98/42 |
| 2,784,568 | 3/1957 | Schjoun | 62/117 |
| 2,888,251 | 5/1959 | Dalin | 165/163 X |
| 3,315,488 | 4/1967 | Lind | 62/241 |
| 3,528,607 | 9/1970 | Plockett | 237/2 |
| 3,670,808 | 6/1972 | Wait, Jr. | 165/42 |
| 3,742,567 | 7/1973 | Kaelin | 165/163 X |
| 3,848,428 | 11/1974 | Rieter, Jr. | 62/285 |

Primary Examiner—William E. Wayner
Attorney, Agent, or Firm—John E. Reilly

[57] ABSTRACT

A roof-mounted, modular system of evaporator and condensor units is constructed and designed to be interchangeable with existing condensor and evaporator units on a motorized vehicle, such as, a bus or rail car and can be mounted as a external single system or independently mounted and retrofit for incorporation into the existing air conditioning and circulating system of the vehicle. The evaporator unit is compact and of low design height and is operable in combination with existing condensor units and compressor systems of the vehicle or can be combined with the modular condensor unit. The evaporator contains evaporator coils flanked on either side by heater coils, an expansion valve and control panel as well as the necessary blower fans together with a damper-controlled fresh air/return air system to meet all heating and cooling requirements of the vehicle.

4 Claims, 7 Drawing Figures

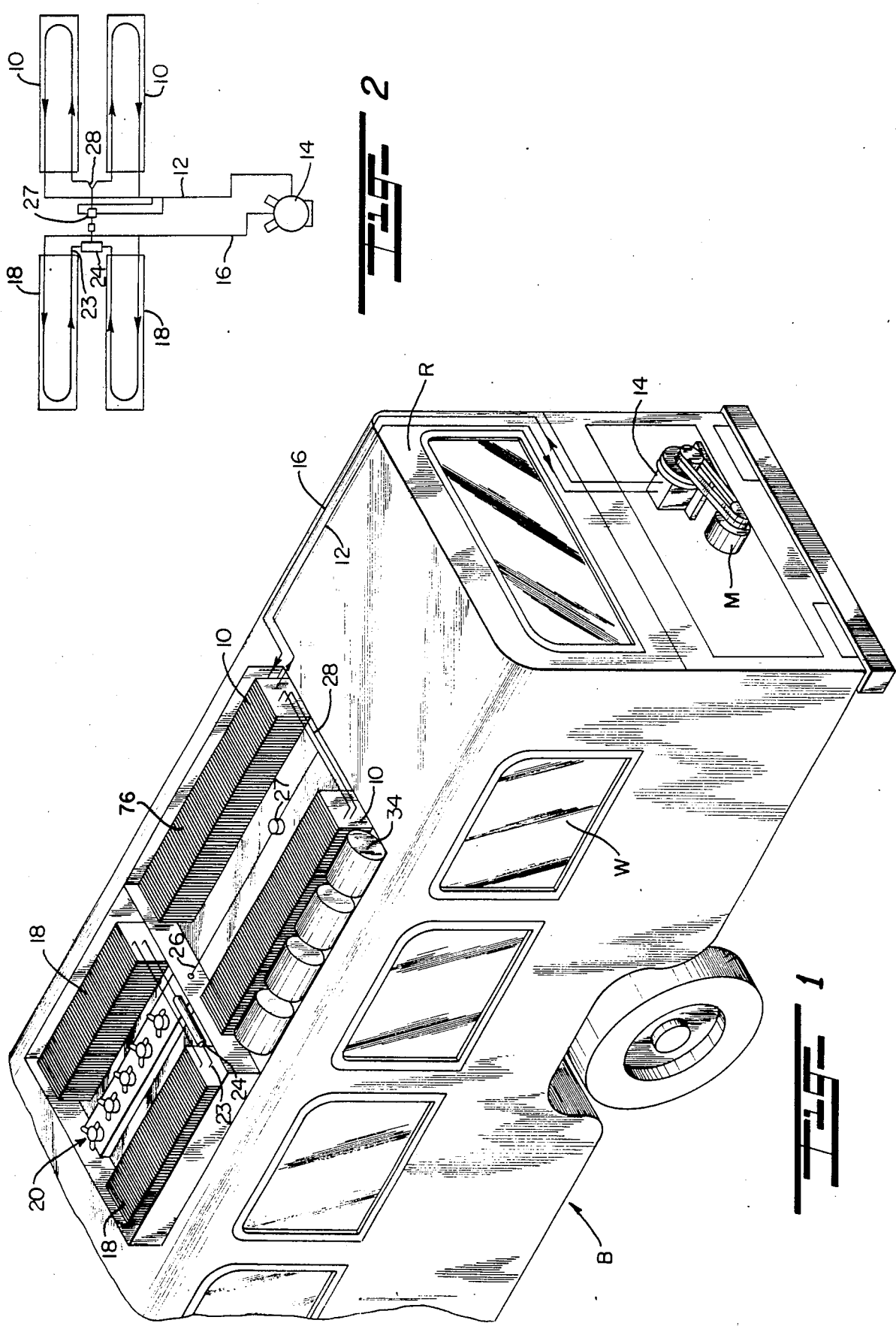

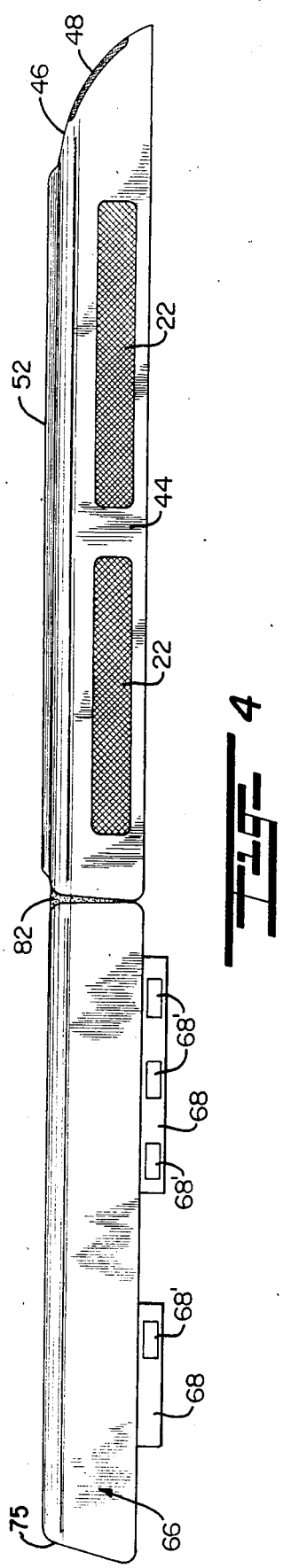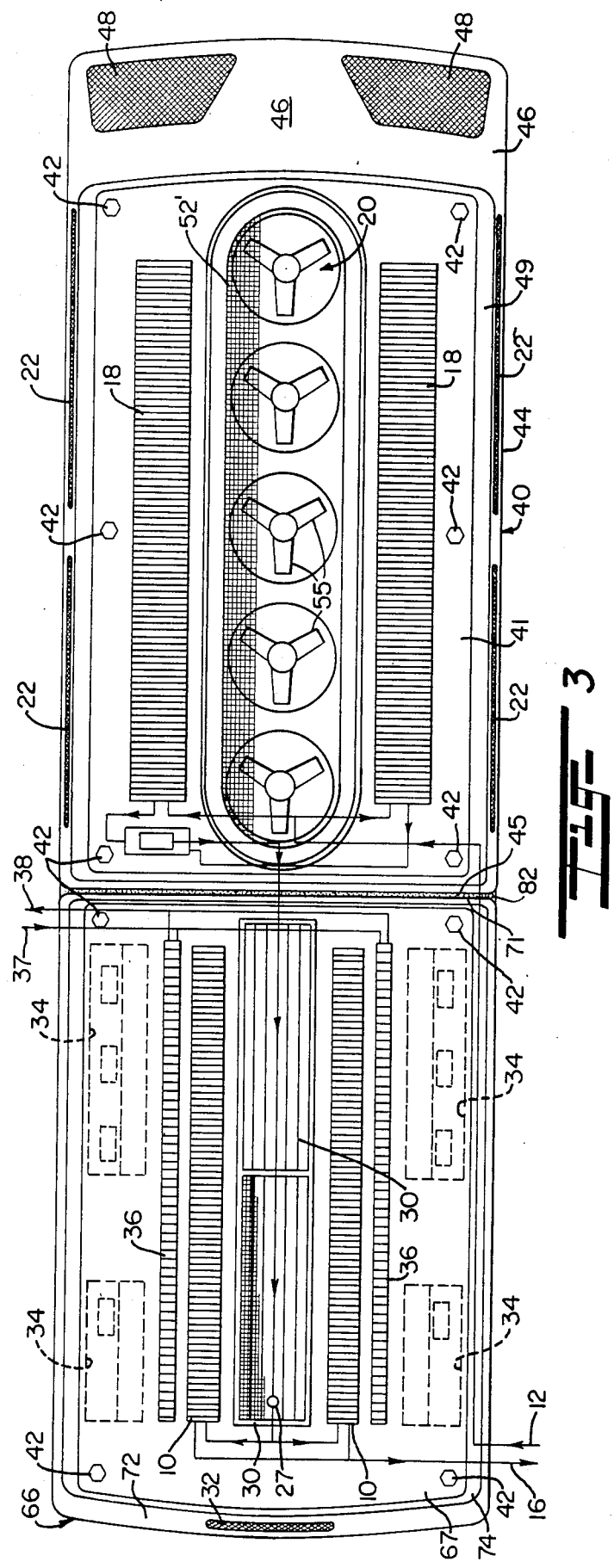

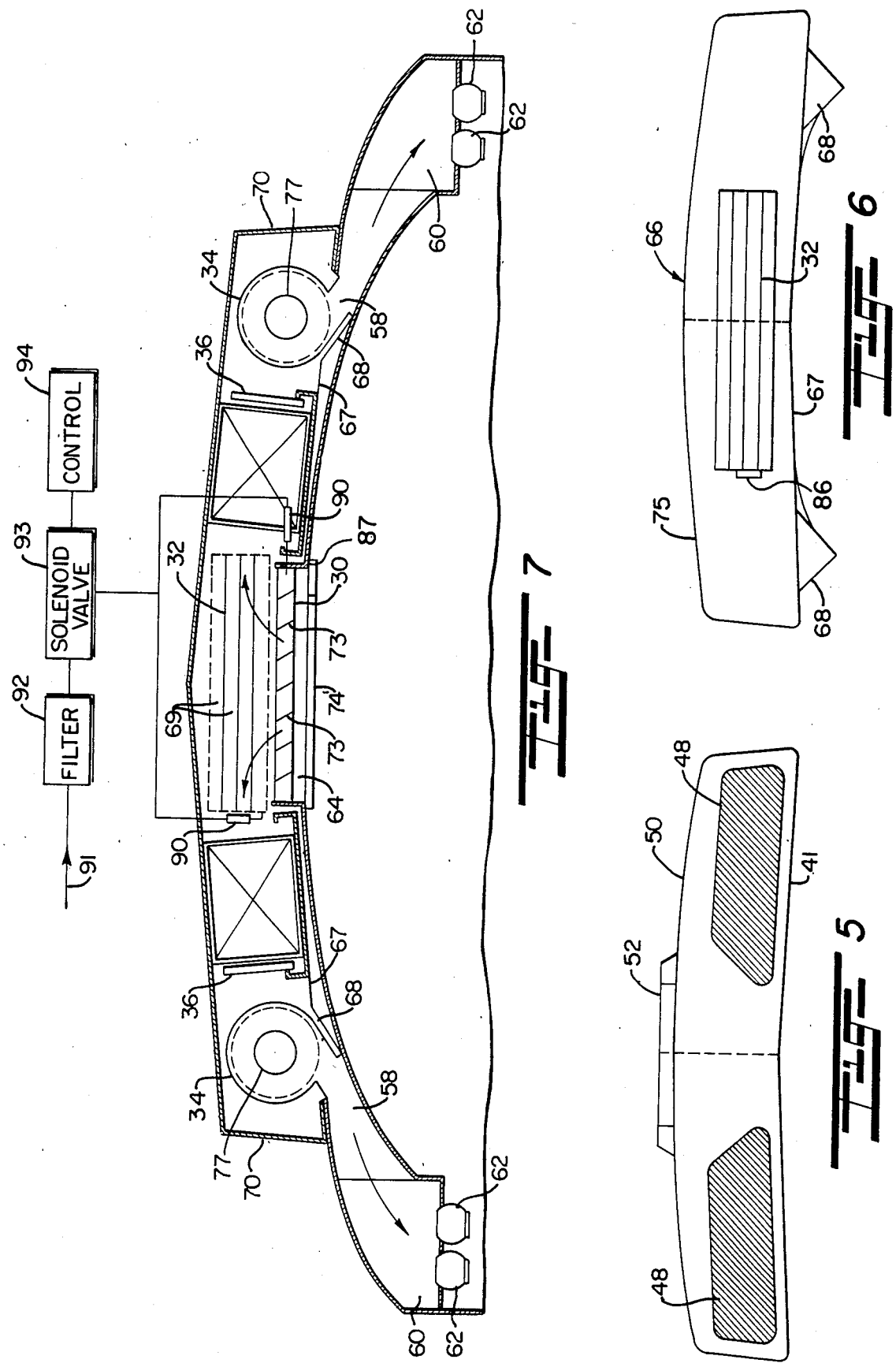

ROOF-MOUNTED AIR CONDITIONER SYSTEM HAVING MODULAR EVAPORATOR AND CONDENSOR UNITS

This is a continuation of application Ser. No. 565,026, filed Dec. 20, 1983 now U.S. Pat. No. 4,607,497.

This invention generally relates to air conditioning systems; and more particularly relates to a novel and improved air conditioning system for motor vrehicles, such as, busses or rail cars and characterized by having novel and improved roof-mounted modular condensor and evaporator units.

BACKGROUND AND FIELD OF THE INVENTION

Air conditioning systems have been devised wherein a common housing contains both the evaporator and condensor units which can be mounted externally of the roof of the bus in such a way as to be connected directly into the existing duct system in the ceiling of the bus. One such system is that disclosed in U.S. Pat. No. 4,201,064, assigned to to the assignee of this invention, and which is characterized by having both the condensor and evaporator coils arranged lengthwise in a common housing and so as to extend parallel to the sidewalls of the bus and create the lowest possible design height. There are numerous reasons for positioning both the condensor and evaporator coils in a common housing, principal among them being the necessity of direct connection of the refrigerant lines from the condensor coils via an expansion valve into the evaporator coils for most efficient operation. Nevertheless, there are important factors in favor of independently housing and mounting the evaporator and condensor units so as to be readily comfortable for use on different types and styles of busses and other motor vehicles. Moreover, modular construction and design of the condensor and evaporator units into separate housings achieves other beneficial results from the standpoint of replacement for existing evaporator and condensor units which are built into the motor vehicle so as not to necessitate removal of the existing units.

SUMMARY OF THE INVENTION

It is therefore an object of the present invention to provide for a novel and improved air conditioning system for motor vehicles which is extremely versatile and efficient in design and construction.

It is another object of the present invention to provide for a novel and improved air conditioner system comprised of modular condensor and evaporator units which can be mounted independently or together externally of or integrated into the roof of a motor vehicle.

A further object of the present invention is to provide for roof-mounted modular evaporator and condensor units which are so constructed and arranged as to be interchangeable with different sizes and types of condensor and evaporator units and which can be mounted either as a single system externally of the roof of a bus or other vehicle; or, if desired, can be independently mounted and effectively retrofit externally of the motor vehicle so as to be incorporated into the existing air conditioning and air circulating system of the vehicle without reconstructing or disturbing the existing system.

It is a further object of the present invention to provide for a novel and improved air conditioning system for motor vehicles with an evaporator unit adapted to be mounted on the roof of the vehicle and which is capable of supplying all of the heating and cooling requirements of the vehicle in an extremely efficient and reliable manner.

Yet an additional object of the present invention is to provide in an air conditioner system for busses for roof-mounted, modular condensor and evaporator units which can be externally mounted independently or together and effectively incorporated into the existing air circulating and engine coolant system of the bus so as to meet all heating and cooling requirements of the bus.

In accordance with the present invention, there has been devised a roof-mounted, modular system of evaporator and condensor units, the units being so constructed and designed as to be interchangeable with existing condensor and evaporator units on a motor vehicle, such as, a bus and which can be mounted either as a single system externally of the bus or independently mounted and effectively retrofit so as to be incorporated into the existing air conditioning and air circulating system of bus without disturbing its existing design and construction. For example, the condensor unit can be mounted wholly on the exterior of the bus and connected into the existing compressor and evaporator system; or it can be employed in combination with the modular evaporator unit of the present invention and mounted either as a single system with the evaporator unit or separately mounted at different locations on the roof of the bus. Similarly, the modular evaporator unit of the present invention can be mounted externally of the roof with slots or openings formed through the roof whereby to enable communication with the existing air circulating duct work. The evaporator unit is extremely compact and of a low profile or design height, and is operable in combination with existing condensor units and compressor systems of a bus or, as stated can be combined with the modular condensor unit of the present invention. The evaporator system is further characterized by containing evaporator coils flanked on either side by heater coils, an expansion valve and control panel together with the necessary blower fans to meet all heating and cooling requirements. In this relaton, in the cooling mode, the blower fans are capable of drawing air both from the bus interior and from a fresh air intake at a predetermined ratio so as to effect the necessary cooling and drying of all refrigerated air entering the bus. Any condensation which accumulates on the evaporator coils is effeciently drained away through drain lines at each end of the coils. In the heating mode, the same blower fans are activated such that the heat from the heater coils is intermixed with a predetermined ratio of return air to fresh air and discharged through the existing air circulating ducts of the bus. Preferably, the engine coolant in the bus is used as the heating medium through the coils and which upon passing through the coils is returned to the bus engine for reheating.

Broadly stated, in the air conditioning system of the present invention a condenser unit has a first shallow, generally rectangular housing including a base panel conforming to the contour of the roof, mutually opposed sidewalls and end walls and a cover which serve to enclose elongated condenser coils extending horizontally within the housing and air circulating means between the condenser coils for directing air across the coils and discharging through an air outlet in the cover.

An evaporator unit has a second, outer shallow, generally rectangular housing similarly made up of a base panel conforming to the contour of the roof, mutually opposed sidewalls and end walls and a cover, means for attaching the base panel to the roof with a return air inlet and air circulating ducts in the evaporating unit establish communication between the evaporator housing and interior of the bus, evaporator coils mounted on opposed sides of the return air inlet and elongated heater coils between each of the evaporator coils and opposite sidewalls of the housing. A fresh air inlet is disposed in an end wall of the evaporator housing and evaporator air blower means in the housing directs air through the return air inlet and fresh air inlet simultaneously across the evaporator coils and heater coils preliminary to discharge through the air circulating ducts into the interior of the bus. Damper means associated with the return air inlet and fresh air inlet include temperature responsive control means to regulate the ratio of return air to fresh air drawn through the evaporator housing by the evaporator coils for discharge back into the interior of the bus.

Other objects, advantages and features of the present invention will become more readily appreciated and understood when taken together with the following detailed description in conjunction with the accompanying drawings, in which:

BRIEF DESCRIPTION OF THE DRAWINGS

FIG. 1 is a rear somewhat perspective view of a preferred form of air conditioning system schematically illustrating the refrigerant lines between the condensor, evaporator and compressor in the system in accordance with the present invention;

FIG. 2 is a flow diagram of the refrigerant circuit used in the preferred form of invention illustrated in FIGS. 1 to 7;

FIG. 3 is a top view of the evaporator and condensor units shown in FIG. 2 with portions of the covers removed;

FIG. 4 is a side view in elevation of the condensor and evaporator units shown in FIG. 3;

FIG. 5 is a front view of the condensor unit shown in FIGS. 3 and 4;

FIG. 6 is a rear view of the evaporator unit as shown in FIGS. 3 and 4; and

FIG. 7 is a cross-sectional view of the preferred form of evaporator unit in assembled relation to the roof and ceiling portions of a bus.

DETAILED DESCRIPTION OF THE PREFERRED EMBODIMENT

Referring in more detail to the drawings, there is illustrated in FIG. 1 the working components of the preferred form of air conditioning system which is specifically adaptable for mounting on the roof of a bus B. In the system hereinafter described, freon will be referred to as the heat-carrying medium, although it will be evident that other refrigerants may be employed. Broadly, the freon or other refrigerant in its gaseous state is drawn from evaporator coils 10 through suction line 12 into compressor 14 which is driven off of the bus engine M in a conventional manner. During compression, the cool freon gas undergoes both an increase in temperature and pressure to a degree dependent upon ambient or air temperature. The heated, pressurized gas is then discharged by the compressor through discharge line 16 into condensor coils 18. As the gas circulates internally through the coils, ambient or outside air is drawn through the coil fines by a combination of centrally located condensor fans or blowers 20 and side air inlets 22, the latter being illustrated in FIGS. 3 and 4. The freon gas is thereby liquified as a result of the air movement decreasing the temperature in and around the condensor coils 18 and the increased pressure of the gas created by the compressor. The heat given up by the gas in its conversion into a liquid is expelled by the condensor fans 20.

From the condensor coils 18, the liquid refrigerant is forced into a receiver-dryer 24 via the refrigerant lines 23 from the condensor coils. The refrigerant then travels and advances into the evaporator section via liquid line 26 which is attached to the expansion valve 27, the latter controlling the amount of liquid freon entering the two evaporator coils 19 for proper coolant vaporization. The expansion valve 27 opens and closes in accordance with the temperature and pressure at the evaporator outlet so as to control the amount of freon entering the evaporator coils. Here, the freon enters the evaporator coils 10 through a series of distributor tubes 28 which insure that the freon is distributed evenly within the coils. As best seen from FIG. 1, the receiver-dryer 24 are positioned within the condensor section and together act at a cooling chamber for the hot liquid refrigerant as well as a mixing chamber for oil and refrigerant. In addition, the refrigerant is stored at that point until needed by the evaporators while being filtered and any moisture being dried from the system. Because the expansion valve 27 permits but a selected amount of liquid freon into the evaporator coils, the internal pressure of the coils 10 is reduced causing the freon to absorb heat from the air passing over the evaporator coils as it is vaporized. In a manner to be described, this air is normally drawn from the bus interior through a return air grille 30 and from the exterior of the bus through the fresh air trellis 32 at the rear end of the evaporator section, as shown in FIG. 3. The net effect is to cool and dry all refrigerated air which enters the bus, and the condensation which accumulates on the evaporator coils 10 is drained away through drain lines, not shown, located at each end of the evaporator coils 10.

The air movement across the evaporator coils is initiated and controlled by evaporator blowers 34 located outboard of the evaporator coils and communicating in a manner hereinafter described with air circulating ducts which lead into the bus interior. In this way, heater coils 36 may be interposed between the evaporator coils and blowers 34 which heater coils 36 receive hot engine coolant from the engine when desired to increase the temperature in the interior of the bus, the engine coolant being delivered through circulating lines 37 and 38 to and from the heater coils 36.

Referring in more detail to FIGS. 3 to 7, an important feature of the present invention resides in the modular construction and arrangement of the evaporator and condensor units such that they can be roof-mounted on the bus either independently or together and be interchangeably used with existing condensor and evaporator units on the bus. To this end, and as best seen from a consideration of FIGS. 3 to 7, inclusive, a shallow, generally rectangular housing 40 serves as an enclosure for the condensor coil 18 and intermediate fans or blowers 20. The housing 40 has a base panel 41 conforming to the contour of the roof surface, the base panel being elongated in the lengthwise direction of the bus and attachable to the roof by means of suitable fasteners as represented at 42 which extend through the base panel and roof at spaced intervals as illustrated in FIG. 3. Opposite sidewalls 44 extend vertically upward from opposite sides of the base panel and containing the side air inlets 22. The sidewalls 44 are joined by a rear vertical wall 45 at one end and by a front sloped wall 46, the latter containing front air inlet grilles 48. The sidewalls 44, rear wall 45 and front wall 46 terminate in an upper peripheral edge 49 upon which is mounted a removable cover 50 which slopes or inclines laterally and downwardly away from a common center raised portion 52. In FIG. 3, the cover 50 is broken away except for the center, raised portion 52 hereinafter described.

It will be noted that the condensor coils 18 consist of a series of transversely extending fins or plates disposed in laterally spaced relation to one another on opposite sides of the blowers 20 and are directly affixed to the base panel 41 to extend lengthwise of the housing 40, the fins being of generally rectangular configuration with their longer side edges extending transversely of the length of the housing 40. The blowers 20 consist of a series of vertical access fans disposed in longitudinally spaced relation to one another, each being located beneath an opening 54 in the raised portion 52 and each having a motor drive mounted beneath fan baldes 55 on the base panel 41. The side air inlets 22 in the sidewalls 44 of the condensor section are normally closed by flaps in the manner described in the hereinbefore referred to U.S. Pat. No. 4,201,064 so as to open automatically in the event that a negative pressure is produced in the condensor housing 40. The raised portion 52 of the cover contains a grille 52' aligned in spaced relation above the blowers 20 so that air induced or drawn into the housing by the blowers 20 through the air inlet 22 and across the condensor coils 18 will be discharged upwardly through the openings 54. In this manner, the entire housing 40 and enclosed condensor coils and blower fans are made to be of extremely low profile or design height and can be mounted externally of the bus without modifying the body or shell of the bus.

Somewhat different considerations are involved in the construction of the evaporator section and its mounting to the bus in that the evaporator section must communicate with the existing ductwork in the bus. Conventionally, the bus B has air inlet ducts 58 located on either side of the bus body directly beneath the roof R which slope laterally outwardly and downwardly into air distribution ducts 60 which communicate with air discharge nozzles 62 at longitudinally spaced intervals along the length of the bus B directly above the side windows W shown in FIG. 1. It is also necessary to make provision for a centrally located air inlet opening through the roof and ceiling of the bus in order for return air to be drawn from the interior of the bus for flow across the evaporator coils 10 in the evaporator section, this air inlet opening being designated at 64 in the ceiling portion C of the bus body as shown in FIG. 7. In order to establish the necessary communication with the air inlet opening 64 and the air inlet ducts 58, the evaporator unit as illustrated in FIGS. 2 to 5 comprises a shallow generally rectangular housing 66 having a base panel 67 conforming to the contour of the roof R except for the provision of downwardly projecting chutes or ducts 68 on opposite sides of the base panel. The ducts 68 are of generally triangular configuration and project into slots or openings formed in the roof of the bus, and openings 68' communicate with the air inlet ducts 58 beneath the existing roof line of the bus. The extension ducts 68 are spaced as illustrated in FIG. 4 to accomodate any structural supports in the bus and are located directly beneath the evaporator blowers 34 so as to permit the evaporator blowers to discharge the air drawn over the evaporator coils 10 downwardly through the air discharge nozzles 62. The remainder of the evaporator housing comprises opposite vertical sidewalls 70 extending upwardly from the base panel and joined at one end by a common vertical front wall 71 and at the rear end by a common rear vertical wall 72. The sidewall 70, front and rear walls 71 and 72, respectively, terminate in a common upper peripheral edge 74 which is adapted to receive a cover 75 so as to fully enclose the component parts of the evaporator within the housing 66. The outside air inlet 32 in the rear wall 72 has a series of pivotal dampers 69 arranged thereacross and controlled to move between an open and closed position to regulate the amount of fresh air drawn into the housing 66.

The base panel 67 is affixed to the roof R in the same manner as described with respect to the base panel of the condensor unit; namely, by suitable fasteners 42 at spaced intervals around the outer portion of the base panel and which extend both through the thickness of the base panel and roof to removably attach the evaporator unit in place.

The evaporator coils 10 are elongated in the lengthwise direction of the housing and affixed to the base panel to extend lengthwise along opposite sides of the central air inlet grille 30 which is formed in the base panel to extend the greater length of the housing as shown in FIG. 3, the air inlet grille 30 being aligned with the air inlet opening 64 in the ceiling C of the bus. A filter 74' is disposed in the ceiling C across the opening 64, and a series of pivotal dampers 73 are disposed across the return air grille 30. The dampers are movable between an open and closed position to regulate the amount of return air drawn into the housing 66 by the blowers 34.

Each of the evaporator coils 10 includes transversely extending rectangular fins 76, each having its longer dimension extending in a transverse direction and a shorter dimension extending vertically of the housing. The water heater coils 36 as earlier described are positioned between the evaporator coils 10 and the blowers 34, each heater coil being wrapped spirally around a center core, not shown, and extending for a length corresponding to that of the evaporator coils 10. In turn, the evaporator blowers 34 are mounted outboard of the hot water heater coils 36 there being a series of four radial blowers at equally spaced intervals along the length of the housing directly outboard of the water heater coils and inboard of a sidewall 70, each blower 34 having an air impeller of fan unit 77 centered therein.

The evaporator and condensor housings 66 and 40, respectively, are so constructed and arranged as to enable connection to the roof of the bus either independently or together. In order to facilitate interconnection between the units, the rear wall 45 and front wall 71 of the condensor and evaporator units, respectively, are complementary to one another and are correspondingly straight so as to permit flush mounting and attachment to one another by means of an adhesive or suitable fasteners, not shown, which may suitably take the form of lag bolts extending through aligned openings in the walls 45 and 71 at spaced intervals across the widths of the housings. Preferably, the housings are of lightweight fiberglass construction so as to be corrosion-resistant and extremely durable. A gasket 82 is interposed between external surfaces of the walls 54 and 71 to insulate the housings from one another and to form a cushioned connection between the walls. Referring to FIGS. 1 and 2, openings are formed in the mating walls 45 and 71 for the extension of the refrigerant lines; namely, the discharge line 16 extending from the compressor to the condensor coils and the line 26 from the receiver-dryer 24 to the expansion valve 27. It will be evident that when the condensor and evaporator housings are independently mounted on separate sections of the bus that the refrigerant lines may be increased in length and run through the same openings in the walls 45 and 71 to establish the necessary interconnection between the air conditioning components as described.

In operation, the necessary control for heating, ventilating and air conditioning may be combined into one central control unit in response to sensing outside and inside temperatures via an outer sensor or thermostat 86 and an inside sensor or thermostat 87. The outer sensor 86 is placed in the outside air inlet 32, and the inside sensor 87 is positioned at the return air grille 30. The outside sensor 86 is operative to turn off the compressor 14 below a predetermined temperature level, such as, 50° F. (plus 10° C.), and to start the compressor when the temperature is above a predetermined level, such as, 55° F. (13° C.). In turn, the inside sensor 87 is operative to regulate the heater coils and, for example, to control opening of the valve not shown in line 37 at temperatures below a predetermined level, such as, 72° F. (20° C.). Upon reaching a temperature level above 72° F., the inside sensor 87 will close the valve in line 37 to interrupt the heating cycle. The dampers are normally regulated by the inside sensor 87 and outside sensor 86 to provide a ratio or mixture of 80% return air to 20% fresh air. At the same time, the dampers are regulated to establish optimum ratios of return air to outside air, depending upon the temperature level, so as to maximize the efficiency and performance of the compressor and heater units. Specifically, the opening and closing movement of each damper unit is controlled by an air cylinder 90 which receives air under pressure from a source of air applied over line 91 via filter 92 into a solenoid valve 93. The valve 93 opens in response to a signal from a control circuit 94 causing air to be directed into both cylinders 90 whereby to simultaneously extend the rods of the cylinders and which through linkage 95 will operate to pivot one damper unit to a closed position and the other damper unit to an open position. The signal from the control circuit 94 is generated in response to the temperature level as sensed by the outside sensor 86. For example, at temperatures below 50° F., the outside damper 69 is fully closed and the inside damper 73 is fully open. As the temperature increases to above 60° F., the outside dampers are gradually opened and the inside dampers are closed. When the temperature exceeds 65°, the dampers are regulated to deliver 80% return air to 20% fresh air. Again, the ratio may be varied over a wide range by regulation of the dampers for the fresh air and return air inlets from one extreme in which the inlet 32 is fully closed and the system operated solely with return air, such as, for extremely high temperature levels in which it is desired to operate the compressor at full capacity and to cool only the return air from the interior of the bus; or to the other extreme when it is desired to operate solely on outside air and to close the return air inlet. Preferably, when either damper is in the closed position it will nevertheless permit on the order of 20% of the total air to be drawn through that damper; or in other words to establish the 80%:20% ratio.

From the foregoing, it will be evident that the system of the present invention offers a great deal of versatility and interchangeability specifically wherein the condensor and evaporator units are operative together or individually in combination with other systems and in a manner which will enable direct connection into existing systems on a bus without disturbing or modifying the bus design other than to make the necessary connections for the evaporator section into the existing air circulating systems. The air conditioning system as described is further conformable for use with articulated busses as well as light rail systems wherein condensor and evaporator units may be mounted together on each section or a single condensor unit may be mounted on one roof section and usable in combination with evaporator units placed on each roof section of the articulated system.

It is therefore to be understood that various modifications and changes may be made in the construction and arrangement of the preferred form of the present invention without departing from the spirit and scope thereof as defined by the appended claims.

We claim:

1. In an air conditioner system mounted on the roof of a bus wherein said bus has an upper relatively flat roof, a ceiling spaced beneath said roof with a return air inlet disposed in said roof intermediately between air circulating ducts which extend between said roof and ceiling for directing conditioned air into the interior of said bus, there being compressor means to draw refrigerant from evaporator coils and to discharge said refrigerant under pressure, the improvement comprising:

a modular condensor unit having a first shallow, generally rectangular housing including a base panel conforming to the contour of said roof, mutually opposed sidewalls and end walls and a cover, elongated condensor coils extending horizontally within said housing to receive the refrigerant under pressure from said compressor means, and air circulating means for directing air across said condensor coils between said condensor coils and discharging the air through an air outlet in said cover;

a modular evaporator unit having a second outer shallow, generally rectangular housing including a base panel conforming to the contour of said roof, mutually opposed sidewalls and front and rear end walls and a cover, means for attaching said base panel to said roof whereby said return air inlet and said air circulating ducts are in communication with the interior of said evaporator housing, said evaporator coils mounted on opposite sides of said return air inlet, and elongated heater coils between each of said evaporator coils and opposite sidewalls of said housing, a fresh air inlet in one said end wall of said evaporator housing, and evaporator air blower means in said evaporator housing for directing air through said return air inlet and fresh air inlet simultaneously across said evaporator coils and heater coils preliminary to discharge through said air circulating ducts into the interior of said bus; and said modular condensor unit and said modular evaporator unit mounted independently of one another on the roof of the bus, and refrigerant lines extending between said condensor unit and said evaporator unit including means for conducting the refrigerant from said condensor coils to said evaporator coils.

2. In an air conditioner system according to claim 1, said condensor unit and said evaporator unit housings having complementary end walls, and means for releasably attaching said complementary sidewalls together, said condensor unit having air inlets extending along said sidewalls and one of said end walls.

3. In an air conditioner system according to claim 2, said condensor unit and said evaporator unit being connected in tandem, said complementary end walls defining a rear wall of said condensor unit housing and a front wall of said evaporator unit housing, and a rear wall of said evaporator unit housing having said fresh air inlet centrally disposed therein.

4. In an air conditioner system according to claim 1, said evaporator coils being elongated and extending horizontally in a direction parallel to the length of said bus, said heater coils being elongated and extending horizontally in a direction parallel to the length of said bus intermediately between said evaporator coils and said air circulating ducts, said return air inlet and said fresh air inlet being located intermediately between said evaporator coils.

* * * * *